United States Patent
Mysen et al.

(10) Patent No.: US 8,027,990 B1
(45) Date of Patent: Sep. 27, 2011

(54) DYNAMIC QUERY SUGGESTION

(75) Inventors: Clarence C. Mysen, Menlo Park, CA (US); Scott E. Schwartz, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 414 days.

(21) Appl. No.: 12/170,060

(22) Filed: Jul. 9, 2008

(51) Int. Cl.
*G06F 17/30* (2006.01)

(52) U.S. Cl. ........ 707/766; 707/758; 707/765; 707/767; 707/768; 707/769; 707/771; 707/775

(58) Field of Classification Search .................. 707/713, 707/722, 723, 765–769, 771, 775, 758
See application file for complete search history.

(56) References Cited

U.S. PATENT DOCUMENTS

| | | | |
|---|---|---|---|
| 5,787,430 A * | 7/1998 | Doeringer et al. ................ | 1/1 |
| 6,377,945 B1 * | 4/2002 | Risvik ................................ | 1/1 |
| 6,421,660 B1 * | 7/2002 | Glaise .......................... | 707/749 |
| 6,564,213 B1 | 5/2003 | Ortega et al. | |
| 6,859,455 B1 * | 2/2005 | Yazdani et al. ............... | 370/392 |
| 7,461,059 B2 * | 12/2008 | Richardson et al. ................. | 1/1 |
| 7,783,660 B2 * | 8/2010 | Nomula et al. ............... | 707/769 |
| 2006/0190436 A1 * | 8/2006 | Richardson et al. ............. | 707/3 |
| 2008/0086488 A1 * | 4/2008 | Nomula et al. ............... | 707/101 |
| 2009/0144271 A1 * | 6/2009 | Richardson et al. ............. | 707/5 |
| 2010/0299358 A1 * | 11/2010 | Venkataraman et al. ..... | 707/769 |
| 2010/0325106 A1 * | 12/2010 | Venkataraman et al. ..... | 707/723 |

* cited by examiner

*Primary Examiner* — Frantz Coby
(74) *Attorney, Agent, or Firm* — Fish & Richardson P.C.

(57) ABSTRACT

A query prefix is received from a user device. A user identifier is determined based on the user device. A user category is determined based on the user identifier. A node representing the query prefix is located in a query graph. Descendent nodes of the located node that represent queries are located. Each node has one or more user category specific frequency measures and each user category specific frequency measure is associated with a user category. The queries represented by the located nodes are ranked based on the associated user category specific frequency measure associated with the identified user category. The ranked queries are sent to the user device.

20 Claims, 5 Drawing Sheets

DYNAMIC QUERY SUGGESTION

This specification relates to generating alternative query suggestions for a user who has submitted a search query.

BACKGROUND

Modern search engines, and search engine tools such as browser toolbars, typically provide query suggestions for query prefixes. For example, if a user enters the prefix mon, the search engine can suggest one or more queries having the prefix mon, such as money, monkey, monster, and so on. Typically, the search engine generates the suggested query terms by referencing a table of prefixes. For example, the table can contain a row entry for the prefix mon containing possible queries having the prefix mon. A description of a system for providing query suggestion can be found at http://www.suggestexplorer.com/about.html, for example.

SUMMARY

In one general aspect, a query prefix is received from a user device. A user identifier is determined based on the user device. A user category is determined based on the user identifier. A node representing the query prefix is located in a query graph. Descendent nodes of the located node that represent queries are located. Each node has one or more user category specific frequency measures and each user category specific frequency measure is associated with a user category. The queries represented by the located nodes are ranked based on the associated user category specific frequency measure associated with the identified user category. The ranked queries are sent to the user device.

Implementations may include the following features. The query graph may be a Patricia trie. Only queries represented by located nodes that have an associated user category frequency measure greater than a threshold frequency may be sent. The query prefix may be received from a browser executing at the user device. The query prefix may be received from a toolbar executing at the user device.

Particular implementations of the subject matter described in this specification can be implemented so as to realize one or more of the following advantages. One advantage is building a user profile for users based on previous searches to categorize the user into one or more user categories. Another advantage is the creation of a lookup system that can be queried to determine a user's profile. Another advantage is to construct a query graph structure that includes search probabilities based on user categories. Another advantage is to provide dynamic updating of the query graph structure to account for current events and recent queries. Another advantage is to identify related searches and to include links in the query graph structure to reflect the related searches.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Figure 1:
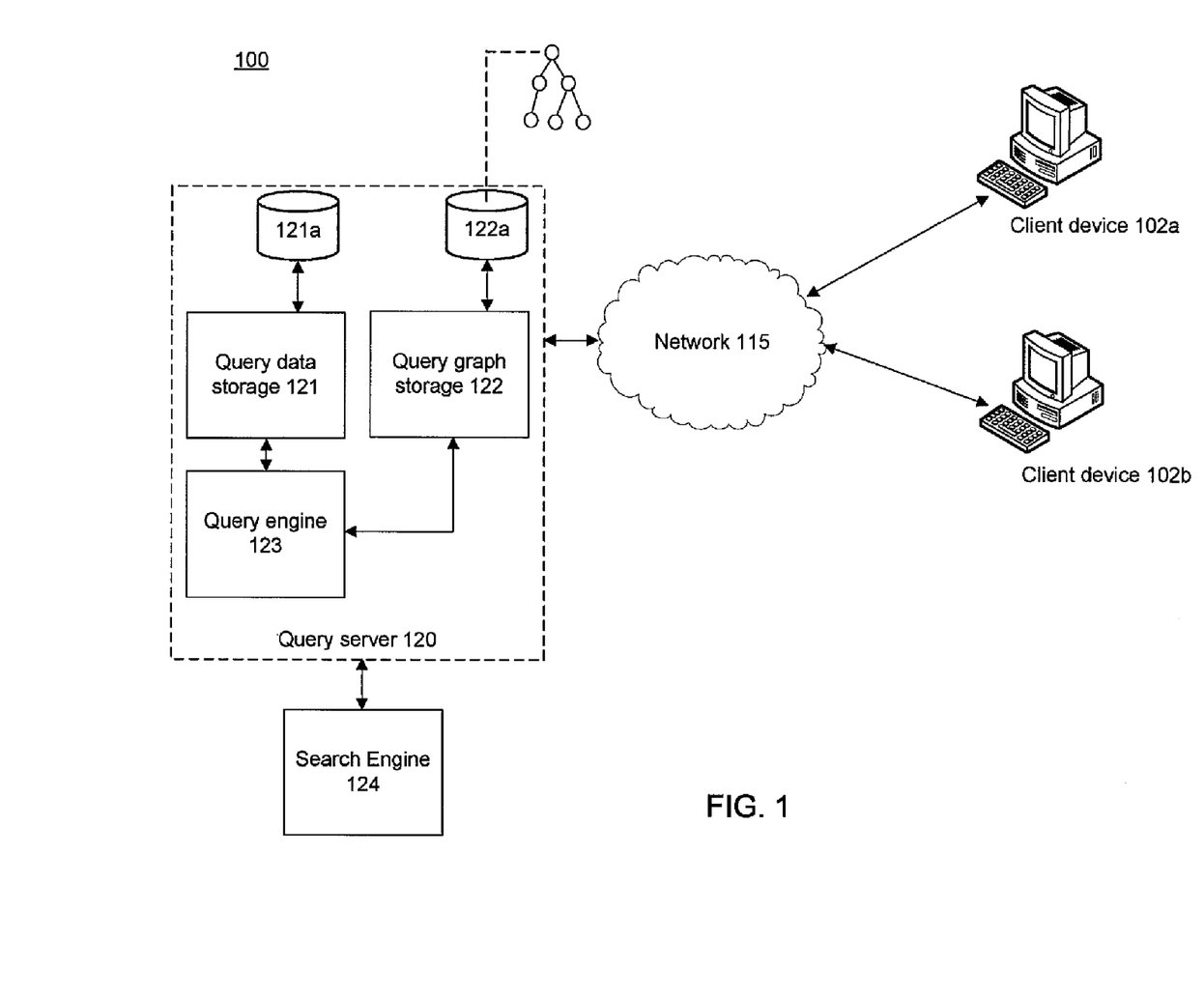
FIG. 1 is a block diagram of an example environment in which dynamic query suggestions can be provided.

FIG. 1 is block diagram of an example environment 100 in which dynamic query suggestions can be provided. For example, the dynamic query suggestions can be provided by a query server 120. In some implementations, a dynamic query is a suggested query that is identified from a received query prefix. Query prefixes for a query include all possible substrings of the query that begin with the first character of the query and preserve the character ordering of the query. For example, query prefixes for the query apple include a, ap, app, and appl. The received query prefix may represent the characters that a user has typed so far, but may not necessarily be a prefix of the query suggested.

The environment 100 can include a query server 120 and a search engine 124. The query server 120 can receive query prefixes from clients 102a and 102b and send suggested queries responsive to the query prefixes to the clients 102a and 102b. The query server 120 and the client devices 102a and 102b can communicate through a network 115. The network 115 can include a variety of public and private networks, e.g., a public-switched telephone network, a cellular telephone network, and/or the Internet. The client devices 102a and 102b can be any of a variety of network-capable devices, including desktop and laptop computers, personal digital assistants, cellular phones, smart phones, videogame consoles, and set-top boxes, for example. Users at the client devices 102a and 102b can select a suggested query, which is then submitted by a browser on the client device to the search engine 124 in response. The search engine 124 can search for content responsive to the selected query.

In some implementations, the query server 120 can be integrated into the search engine 124. In other implementations, the query server 120 can be a separate system that is in data communication with the search engine 124.

The query server 120 can use query prefixes to identify query suggestions. For example, a user at a client device (e.g., client device 102a or 102b) can begin typing the query "movies" using a text entry box for a search engine, or a toolbar for submitting a query to the search engine. After the user has typed some prefix of the desired query (e.g., "m") the prefix is sent by the client device, received by the query server 120, and used to identify one or more suggested queries based on the received prefix. The suggested queries are sent to the client device and displayed to the user. The user can then select one of the suggested queries, or if not satisfied, can continue to enter characters of the desired query, for example. As the user enters further characters to further define the prefix, additional suggested queries can be displayed based on the further defined prefix.

Users typically enter multiple queries during a search session that are submitted to the search engine 124. In some implementations, a search session can be defined by a period of time between queries. For example, if a particular user device 102a submits a query, a current search session can be initiated. The current search session can be terminated when the search engine 124 has not received further queries from the user for a preset period of time (e.g., 5-10 minutes). In other implementations, the search session can be defined by a user indicating the beginning and end of a search session (e.g., by logging into a search engine interface of the search engine 124 and logging out of a search engine interface). In still further implementations, the search session can be defined by a relationship between a newly received search query and previously received search queries from the same user (e.g., where the previously received search query in a search session is related to digital cameras, if the newly received search query is related to a new topic other than digital cameras, a current search session is terminated and a new search session is initiated). Other ways of identifying and tracking a search session can also be used.

The query server 120 includes a query data storage 121. The query data storage 121 can store a variety of query data 121a relating to past queries submitted by users during past search sessions. In some implementations, the query data 121a can include search engine log data generated from the search engine 124. The query data 121a can include frequency measures defining how many times a particular query was received or a measure of the query submission relative to other queries, for example. The query data 121a can also include session data identifying search sessions and the queries submitted during these sessions.

The query data 121a can further include user identifiers that uniquely identify the user associated with a query, and one or more user categories associated with the user. Category-specific frequency measures indicating how many times a particular query was received for particular categories can also be included in the query data 121a.

In some implementations, the user identifiers are anonymized for privacy protection. For example, a toolbar search interface can generate a unique identifier that is not linked or otherwise explicitly associated with a user. Thus, user queries that are submitted by use of the toolbar interface on a particular user device are associated with each other, but the queries are not otherwise associated with any particular user. In other implementations in which a user logs into a search engine account, identifying information related to the user's searches can be anonymized, e.g., a user identifier can be hashed so that the queries are still associated by the hash value but are otherwise not associated with the user identifier.

In some implementations, the search queries can be grouped into user categories. The user categories can, for example, be determined by performing statistical analysis of the queries submitted by the users. For example, clustering techniques, such as K-means clustering, can be used to identify queries and/or sessions that include similar terms. These clusters can be used to define user categories. For example, search sessions that include primarily automotive terms, such as automobile brand names and engine terms, can result in a cluster that relates to car enthusiasts. Likewise, search sessions that include primarily pop music terms, such as band names or artists' names, can result in a cluster that relates to music enthusiasts.

In some implementations, a user can be matched to one or more categories based on the queries submitted by the user. For example, if the user has submitted several car related queries, the user can be associated with a user category car lover. Similarly, if a user submitted several music related queries, the user can be associated with a user category music lover. Thus, the user categories with which a user is associated can be automatically determined by processing the queries submitted by the user using keywords associated with each of the user categories.

In other implementations, the user categories can be selected by the user. For example, a user can be asked to select one or more interests. A user who selects cars or music as an interest can then be associated with the car lover or music lover user category respectively.

The combination of user categories identified from the query data 121a and the association of a user to one or more identified user categories can facilitate the provisioning of query suggestions that are specific to a user's interests. In some implementations, such features can be realized by use of a query graph. For example, the query server 120 includes a query graph storage 122 that stores one or more query graphs (e.g., query graph 122a) generated from the query data 121a.

In some implementations, the query graph 122a is a graph of nodes, with each node representing a portion of a query. A portion of a query can be a whole query, a prefix of a query, or both. For example, a node may represent the word foot, which is both a query and a query prefix (foot is a query prefix of the query football).

Each node can further have associated child nodes. In some implementations, the query graph is implemented in part as a Patricia trie, radix tree, or other tree structure. However, a variety of other data structures can be used.

Figure 2:
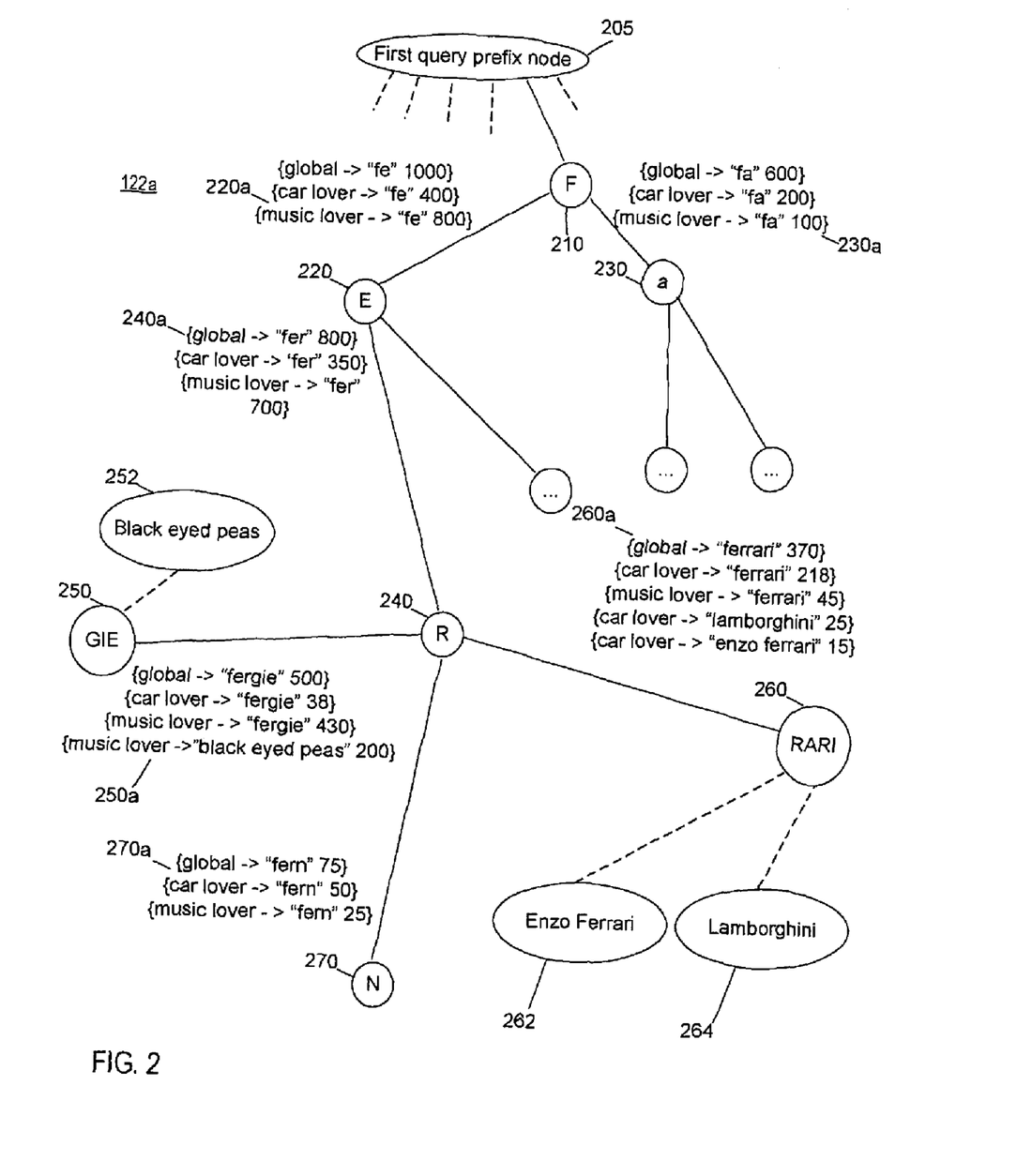
FIG. 2 is an illustration of an example query graph.

FIG. 2 is an illustration of an example query graph 122a. The query graph 122a can be used to store one or more queries according to categories and category frequencies, and can retrieve stored queries matching a query prefix. The illustrated portion of the query graph 122a stores the queries fern, fergie, and ferrari. In some implementations, the query graph 122a is a Patricia trie, however other data structures can be used.

The query graph 122a contains nodes 210, 220, 230, 240, 250, 260, and 270. Each of nodes 250, 260, and 270 represent queries. Each of nodes 210, 220, 230, and 240 represent query prefixes. For example, node 250 represents fergi, node 260 represents ferrari, and node 270 represents fern. Similarly, node 210 represents f, node 220 represents fe, node 230 represents fa, and node 240 represents fer.

Each node can have multiple child nodes. The child nodes can similarly represent queries or query prefixes. As illustrated, nodes 250, 260, and 270 are children of node 240. Node 240 is a child of node 220. Nodes 220 and 230 are children of query prefix node 210. Children of a node's child nodes are the node's descendants. Thus nodes 240, 250, 260, and 270 are descendants of node 210.

The query graph 122a includes a root node 205. The root node is a special query prefix node that represents all supported characters. For example, these characters can include a wide variety of characters such as the characters from the Latin alphabet or other writing systems, characters from other alphabets, and special characters, for example, #, @, and $.

In some implementations, some nodes are associated with a frequency measure. The frequency measure can represent the number of times the represented query prefix or query was submitted as a query.

In some implementations, the nodes have associated with them user category specific frequency measures. A user category specific frequency measure can represent the number of times the represented query prefix or query was submitted as a query, or was part of a query submission from a user associated with that user category. Examples of user categories can include car lover, music lover, and gadget lover. Some user categories may be created though clustering techniques based on user interests. These user categories may categorize users based on similar search histories, for example. A user can be a member of multiple categories or no categories, for example.

As illustrated, each node has an associated frequency measure (i.e., the frequency measure marked global). Similarly, each node also has associated user category frequency measures. Each user category specific frequency measure is associated with a user category. For all queries submitted, there were 1,000 prefixes that include fe, as represented by the global frequency count of 1000. Of those 1,000 prefixes, 800 were submitted by users belonging to the category of music lover, and 400 were submitted by users belong to the category of car lover. Some of the users that submitted the queries belonged to both the music lover and car lover category, as the category specific frequencies of 800 and 400 create a summed total greater than the global frequency of 1,000.

In some implementations, alternative query data is associated with the nodes. The alternative query data can identify queries that are related to the query represented by the node, but that can not share a common prefix or even common characters. For example, node 250 has associated alternative query data indicating the query black eyed peas, which is the name of a musical group of which the artist Fergie is a member. Node 260 includes alternative query data indicating the queries Lamborghini and Enzo Ferrari. In some implementations, the alternative query data for a given node includes links to other nodes representing the related queries. For example, node 250 includes a link to node 252 and node 260 includes a link to nodes 262 and 264. The alternative query data can additionally have associated frequency measures and category specific frequency measures, for example.

In some implementations, where nodes represent misspellings of queries, the alternative query data identifies the correct spelling of the misspelled query, or can include a link to the node representing the correct spelling of the query. For example, a node representing ferrarri can include a link to the node representing Ferrari.

In some implementations, a query engine 123 constructs the query graph 122a by mining the query data 121a. The root node 205 can be created, representing an empty graph, and a query stored in query data 121a can be selected. The query server 120 can determine whether a node representing the selected query is present in the query graph 122a by searching the query graph 122a for a node representing the query. In some implementations, the query server 120 locates the node by starting from the root node 205 and moving to successive descendent nodes, each descendent child node representing a larger and larger prefix of the selected query.

If the query engine 123 reaches a node representing the selected query, then the selected query in is the query graph 122a. If the query engine 123 does not reach a node representing the selected query, then the query is not in the query graph 122a. In some implementations, if the selected query is not in the query graph 122a, the query engine 123 can add the query into the query graph 122a by adding a child node representing the query to the last visited node representing a query prefix, for example. The query engine 123 can continue to select and add queries to the query graph 122a until all of the queries in the query data 121a have been added, for example.

In some implementations, when the query engine 123 determines that a node representing the selected query is present in the query graph 122a, the query engine 123 increases the frequency measure associated with the node and increase the frequency of nodes having the node as a child or descendant. In some implementations, the frequency measures are increased by adding 1, for example, to the frequency measures. Where the query data 121a defines a frequency for the selected query, the frequencies can be increased by adding the amount defined in the query data 121, for example. In other implementations, the query engine 123 increases any category specific frequency measures associated with the selected query and the node, as well as increase any category specific frequency measures associated with the nodes having the node as a child or descendant.

In some implementations, the query engine 123 may add alternative query data to one or more nodes of the query graph 122a. In one implementation, the query engine 123 may add alternative query data to a node corresponding to query terms that occurred during the same search sessions as the query represented by the node. The query terms that occurred during the same search sessions as the query represented by the node may be determined from the query data 121a, for example. In other implementations, the query engine 123 may add alternative query data to a node, by replacing the terms of the query resented by node with known variations of the terms and adding the new terms to the node as alternative query data. For example, the terms may be replaced by known synonyms, homonyms, and common misspellings.

The query engine 123 can also receive query prefixes from user device 102a and 102b and identify query suggestions using the query graph 122a stored in the query graph storage 122. The query engine 123 can further identify user categories for the received query prefix. In some implementations, the received query prefix can include a user identifier associated with the received query prefix. The received user identifier can be used to identify user categories associated with the user or search session of the user device. In other implementations, the user categories associated with the user or search session of the user device are derived after several queries have been received, e.g., a search session in which several automotive terms have been received can be used to associate the received queries with a car lover user category.

In some implementations, the query engine 123 identifies query suggestions using the received query prefix by locating the node representing the received query prefix in the query graph 122a. After locating the node representing the query prefix in the query graph 122a, the query suggestions for the received query prefix can be identified by locating descendent nodes of the located node that represent queries. The queries represented by the located descendent nodes can then be sent to a client device (e.g., client devices 102a and 102b) and presented to the user.

In some implementations, the queries are first ranked according to the frequency measure associated with their representative nodes. The queries can then be presented to the user in rank order (e.g., highest ranked query first). In other implementations, there is a threshold frequency measure defined by the user or an administrator. Only queries having a representative node with an associated frequency measure above the threshold frequency can be presented to the user, for example.

In other implementations, the queries are ranked according to associated user category specific frequency measures corresponding to user categories associated with the user. For example, if the user in a member of the user category car lover, then the queries are ranked according to the car lover category frequency measure associated with their representative nodes.

In some implementations, multiple query graphs are constructed with each query graph including nodes associated with particular user categories. For example, one query graph can be constructed from the query data associated with the user category car lover and another query graph can be constructed from the data associated with the user category music lover. When a subsequent query prefix is received from a user, the query engine 123 can determine the user category associated with the user and use the query graph corresponding to the user category. Further, the query graphs can be associated with separate query servers 120 or query graph storages 122, for example.

The query server 120, the query engine 123, the query data storage 121 and the query graph storage 122 can be implemented on single computer systems, or as a distributed computer system comprising multiple computers (e.g., a server farm).

Figure 3A:
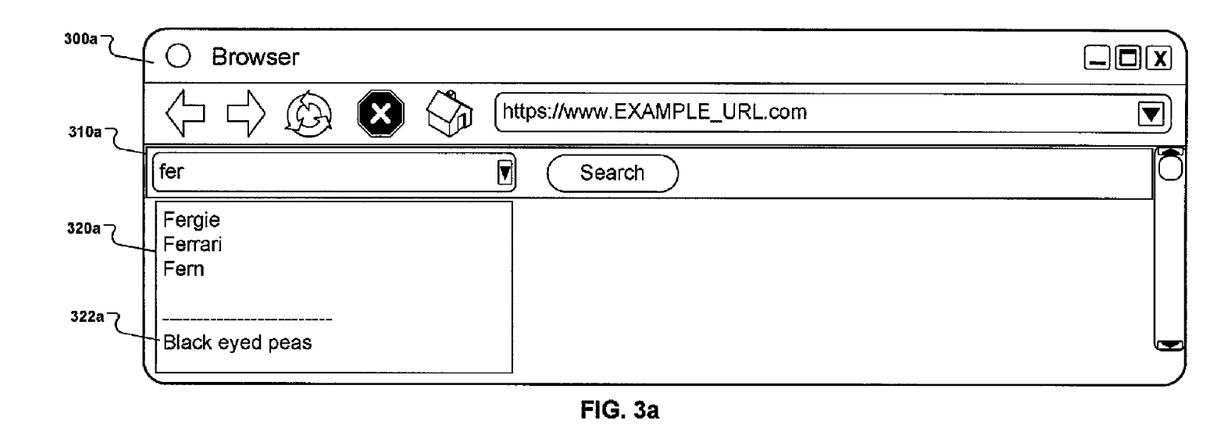
FIGS. 3a and 3b are illustrations of example user interfaces implementing a dynamic query suggestion system.
Figure 3B:
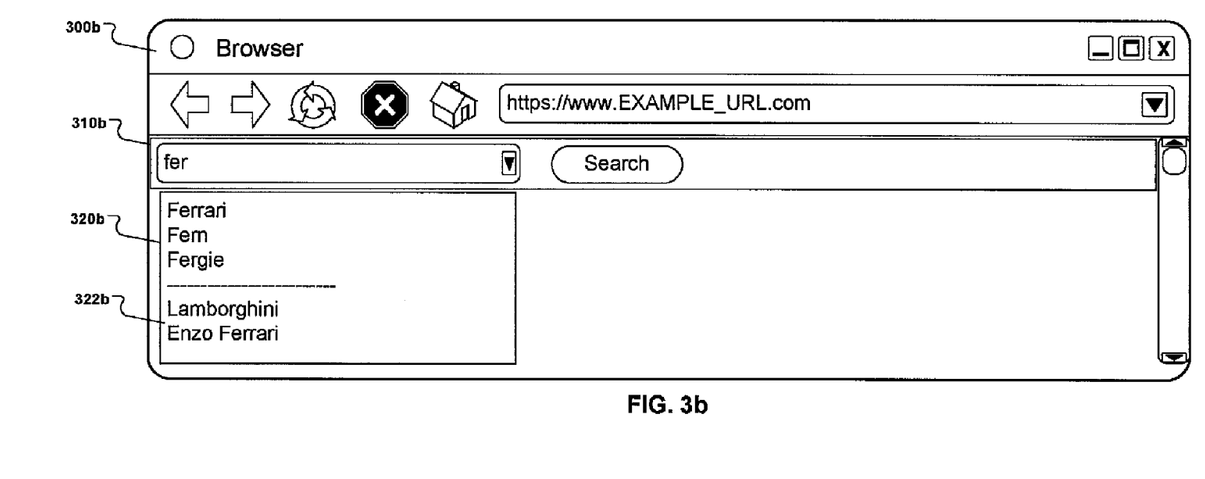

FIGS. 3a and 3b are illustrations of example user interfaces 300a and 300b implementing a dynamic query suggestion system. The user interfaces 300a and 300b can be implemented at a client device, such as a client device 102a or 102b, for example.

As shown, the user interfaces 300a and 300b are implemented as toolbars integrated into a browser. A user can submit queries using the text boxes 310a and 310b. As shown, both users have entered the query prefix fer into the text boxes 310a and 310.

The users of the user interfaces 300a and 300b can have one or more associated user categories. For example, a user category associated with the user of the user interface 300a can be music lover and a user category associated with the user of the user interface 300b can be car lover. The associations can be based on user identifiers, e.g., the users of the user devices can have logged into the search engine 124 by use of user accounts, or the identifiers of a toolbar can have been provided to the query server 120. Alternatively, the associations can be based on previous queries recently sent from the user devices, e.g., if the user of user device submitted the queries fast cars, BMW, and auto racing prior to entering fer, the query engine 123 can have associated the session with the car lover user category.

The entered query prefixes can be sent to the query engine 123 of the query server 120 to identify one or more suggested queries based on the provided query prefix. In addition, a user identifier can also be sent to the query engine 123 to identify one or more categories associated with the user. In some implementations, the client device can send the categories associated with the user, for example.

The query engine 123 can locate one or more suggested queries for the provided query prefix using the query graph 122a and the user categories associated with the user. For example, users of the user interfaces 300a and 300b have both entered the query prefix fer. The query engine 123 locates the node in the query graph 122a corresponding to the query prefix fer (e.g., the node 240). The query engine 123 then identifies all the descendent nodes of the located node (e.g., nodes 250, 260, and 270). The query engine 121 can then rank the queries associated with the located nodes according to the user category associated with the user who provided the query prefix.

The user of the user interface 300a is associated with the user category music lover, therefore the top ranked query for that user category is fergie with a frequency measure of 430, the next ranked query is ferrari with a frequency of 45, and the last ranked query is fern with a frequency of 25. The user of the user interface 300b is associated with the user category car lover, therefore the top ranked query is ferrari with a frequency of 218, the next ranked query is fern with a frequency of 50, and the last ranked query is fergie with a frequency of 38.

The ranked queries can be provided to the users in the query suggestion displays 320a and 320b, for example. The suggested queries are displayed in the query suggestion display 320a ordered according to the frequency measures associated with the music lover category. Similarly, the suggested queries are displayed in the query suggestion display 320b ordered according to the to the frequency measures associated with the car lover category.

In some implementations, additional alternative query data associated with one or more of the located nodes can be provided and displayed. For example, node 250 has associated alternative query data for the category music lover comprising a link to the node representing black eyed peas. Similarly, the node 260 has alternative query data for the category car lover comprising links to nodes representing Lamborghini and Enzo Ferrari. In some implementations, the alternative query data is displayed in the query suggestions display 320a and 320b in a portion of the display reserved for alternative query data, for example under the hashed lines in display portions 322a and 322b.

Figure 4:
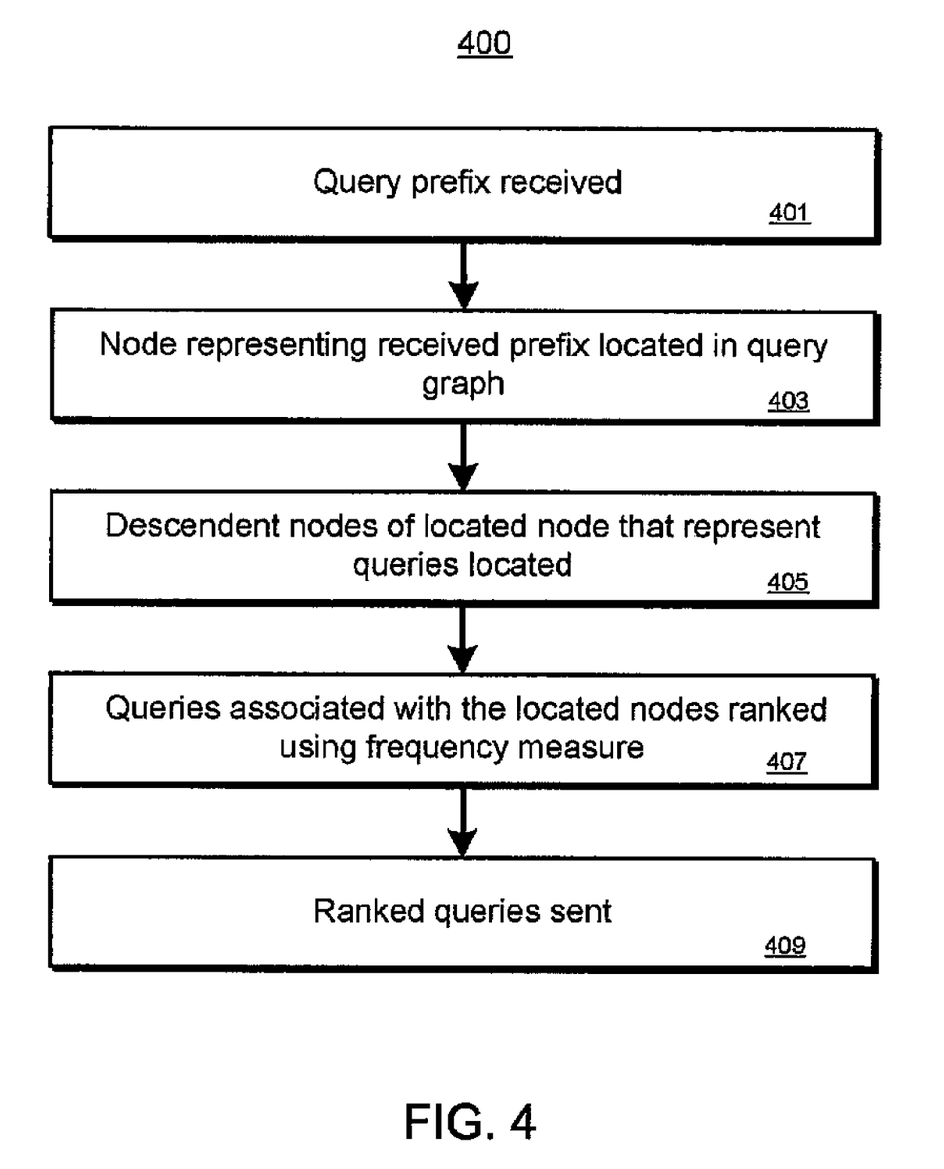
FIG. 4 is a flow diagram of an example process for generating query suggestions.

FIG. 4 is a flow diagram of an example process 400 for generating query suggestions. The process 400 can be implemented using a query server 120, for example.

The query server 120 receives a query prefix (401). In some implementations, the query prefix is received with a user identifier. The user identifier can uniquely identify the user who submits the query prefix or a device from which the query prefix is submitted. The user identifier can be provided from a cookie or user data file stored at the client device. In other implementations, the user identifier is provided by the user by through a user login or other authentication process. In still other implementations, the user identifier may be determined based on the client device 102a that the prefix was received from. Further, the user identifier can be anonymized to protect the privacy of the user associated with the user identifier.

The query server 120 locates a node representing the received prefix (403). The node can be located in the query graph 122a by the query engine 123 of the query server 120, for example.

The query server 120 locates nodes that are descendants of the node representing the received query prefix (405). The descendent nodes can be located by the query engine 123 of the query server 120, for example. In some implementations, the descendent nodes of the located node can be located by recursively following the child nodes until a node representing a query is reached, for example.

The query server 120 ranks the queries associated with the located nodes (407). The queries associated with the located nodes can be ranked according to frequency measures associated with the nodes by the query engine 123 of the query server 120, for example. In some implementations, the queries can be ranked according to user category specific frequency measures corresponding to one or more of the user categories associated with a user identifier of the user who the query prefix was received from, for example.

The query server 120 sends the ranked queries associated with the located nodes (409). In some implementations, the ranked queries are sent by the query engine 123 of the query server 120 to the client device (e.g., client device 102a) that the initial query prefix was received from. The queries are received by the client device and displayed to the user according to the ranking. For example, the received queries can be displayed in a user interface similar to the user interface 300a of FIG. 3, for example.

In some implementations, the query server 120 can also provide alternative query data associated with the located nodes. As described above, alternative query data can comprise one or more queries that are related to the query represented by the node, but that may not share a prefix with the query represented by the node. For example, the query Enzo Ferrari can be related to the query Ferrari. The alternative query data for a particular node can be determined by the query server 120 using the query data 121a, for example. In some implementations, the queries represented by the alternative query data can be ranked according to frequency measures associated with the alternative query data, for example.

The queries represented by the alternative query data can be presented to the user along with the ranked queries. In some implementations, the queries represented by the alternative query data are presented in a way as to differentiate them from the ranked queries. For example, as illustrated in FIG. 3, the queries represented by the alternative query data are presented in the display windows 322a and 322b. Alternatively or additionally, the queries represented by the alternative query data can be displayed using a particular font or text color to further distinguish them from the ranked queries, for example.

Figure 5:
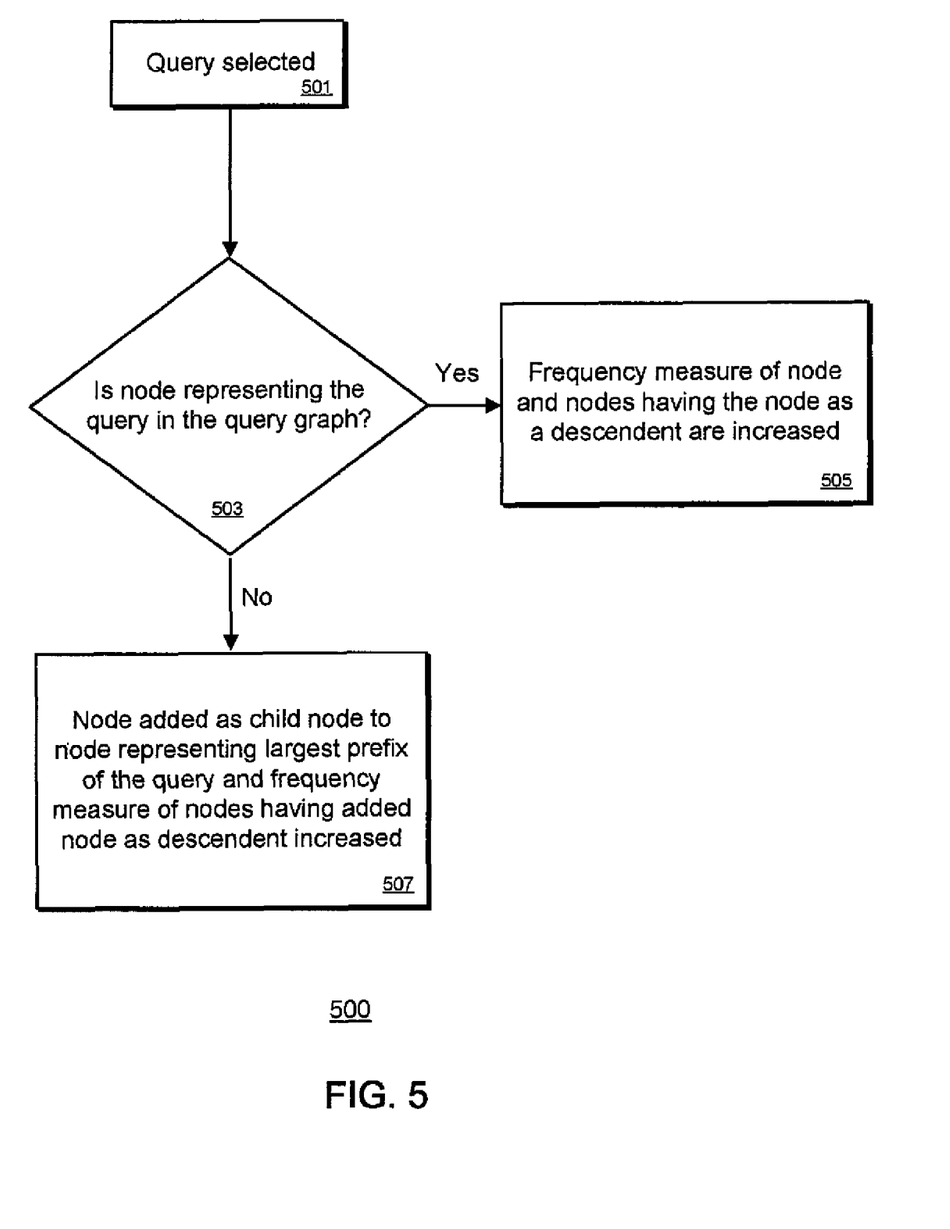
FIG. 5 is a flow diagram of an example process for adding a node representing a query to a query graph.

FIG. 5 is a flow diagram of an example process 500 for adding a node representing a query to a query graph. The process 500 can be implemented using a query server 120, for example.

The query server 120 selects a query (501). The query can be selected by the query engine 123 of the query server 120, for example. In some implementations, the query can have been selected from the query data 121a at the query data storage 121, for example. The query can have been selected from the query data 121a as part of the building, or updating, of the query graph 122a. The query data 121a can comprise a log of queries received by a search engine, for example.

The query server 120 determines whether a node representing a query is in a query graph (503). The determination can be made by the query engine 123 of the query server 120 using the query graph 122a, for example. If a node representing the query is present, the query server 120 increases the frequency measure associated with the node (505). As described above, each node can have an associated frequency measure describing the frequency, or number of times, the query was received. The frequency can be increased by adding 1 to the frequency measure, for example. In some implementations, frequency measures of query prefix nodes having the node as a descendant are also increased.

In some implementations, where the query has an associated user category, the user specific category frequency measure associated with the node representing the query can also be increased. For example, if the query was received from a user in the user category car lover, then the frequency measure specific to the category car lover can be increased for the node. In some implementations, user category specific frequency measures of nodes having the node as a descendant can also be increased.

If a node representing the query is not present, the query server 120 adds a node representing the query (507). The node can be added to the query graph 122a by the query engine 123 of the query server 120, for example. In some implementations, the node can be added as a child node to the node in the query graph representing the largest prefix of the query located in the query graph. For example, if the query was fergie, and the query graph contained nodes representing f, fe, and fer, then a node representing fergie can be added to the query prefix node representing fer as a child node.

In some implementations, the query server 120 generates a frequency measure for the added node. The frequency measure can be initially set to 1, for example.

In some implementations, the query server 120 increases frequency measures associated with nodes having the added node as a descendent. For example, by adding 1 to the frequency measure associated with each node having the added node as a descendent. Continuing the example described above, the frequency measures associated with the nodes representing f, fe, and fer can be increased.

In some implementations, one or more user category specific frequency measures can also be generated for the added node. For example, if the query represented by the added node is associated with a user from the user category music lover, then a user category specific frequency measure for the category music lover can be generated and associated with the added node. The user category specific frequency measure can be set to 1, for example.

In some implementations, the user category specific frequency measures associated with nodes that have the added node as a descendent are also increased. Further, where a node does not have a user category specific frequency measure corresponding to the user category associated with the query, a user category specific frequency measure can be generated and associated with the node, for example.

The apparatus, methods, flow diagrams, and structure block diagrams described in this patent document can be implemented in computer processing systems including program code comprising program instructions that are executable by the computer processing system. Other implementations can also be used. Additionally, the flow diagrams and structure block diagrams described in this patent document, which describe particular methods and/or corresponding acts in support of steps and corresponding functions in support of disclosed structural means, can also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art can effect alterations, modifications and variations to the examples without departing from the scope of the invention.

What is claimed is:

1. A computer-implemented method comprising:
receiving a query prefix from a user device;
determining a user identifier based on the user device;
identifying an associated user category that is associated with the user identifier;
locating a node representing the query prefix in a query graph;
locating descendent nodes of the located node, the descendent nodes representing queries, wherein:
each descendent node has one or more user category specific frequency measures;
each user category specific frequency measure for each located descendent node is associated with a user category; and
each user category specific frequency measure for each located descendent node is based on a number of times that the query that is represented by the descendent node was received from users that belong to the associated user category;
ranking the queries represented by the located descendent nodes based on a user category specific frequency measure associated with the identified user category; and
sending the ranked queries to the user device.

2. The method of claim 1, wherein the query graph is a Patricia trie.

3. The method of claim 1, wherein sending the ranked queries comprises sending only queries represented by located descendent nodes that have an associated user category frequency measure greater than a threshold frequency.

4. The method of claim 1, wherein the query prefix is received from a browser executing at the user device.

5. The method of claim 1, wherein the query prefix is received from a toolbar executing at the user device.

6. A computer-implemented method comprising:
receiving a query prefix from a user device;
determining a user identifier based on the user device;
identifying an associated user category that is associated with the user identifier;
locating a first node representing the query prefix in a query graph, wherein:
the query graph is a directed graph that comprises a plurality of nodes, each node representing a query, a query prefix, or both, wherein each node representing a query prefix has a directed edge that directs to one or more child nodes; and each node has one or more user category specific frequency measures,
each user category specific frequency measure being based on a number of times that the query that is represented by the node was received from users that belong to the associated user category;
locating descendant nodes of the first node, each descendent node being a node that represents a query;
ranking the queries represented by the located nodes based on the user category specific frequency measure associated with the identified user category; and
sending the ranked queries to the user device.

7. The method of claim 6, wherein the query graph is a Patricia trie.

8. The method of claim 6, further comprising only sending queries represented by located nodes that have an associated user category frequency measure greater than a threshold frequency.

9. The method of claim 6, wherein the query prefix is received from a browser executing at the user device.

10. The method of claim 6, wherein the query prefix is received from a toolbar executing at the user device.

11. A computer-readable medium with computer-executable instructions stored thereon an executable by a processing system and operable to cause the processing system upon such execution to perform operations comprising:
storing a query graph generated from query data, the query data comprising a plurality of queries and the query graph comprising a plurality of nodes, each node representing a portion of a query, wherein each node representing a query prefix directs to one or more child nodes, each node has an associated frequency measure that is based on a number of times that the query that is represented by the node was received from users that belong to an associated user category;
receiving a portion of a query from a user device;
locating a first node representing the portion of a query in the query graph;
locating descendant nodes of the first node, each descendent node being a node that represents a query in the query graph;
ranking the queries represented by the located descendant nodes based on the frequency measures associated with the located descendant nodes; and
sending the portions of queries to the user device.

12. The computer-readable medium of claim 11, wherein the query prefix is received from a browser executing at the user device.

13. The computer-readable medium of claim 11, wherein the query graph is a Patricia trie.

14. The computer-readable medium of claim 11, further comprising:
receiving an identifier of a user category from the user device; and
ranking the portions of queries represented by the located descendant nodes based on the identified user category specific frequency measures associated with the nodes.

15. A system, comprising:
a data store storing a query graph generated from query data, the query data comprising a plurality of queries and the query graph comprising a plurality of nodes, each node representing a portion of a query, wherein each node representing a query prefix directs to one or more child nodes, each node having an associated frequency measure that is based on a number of times that the query that is represented by the node was received from users that belong to an associated user category;
one or more computers configured to interact with the data store and further configured to perform operations including:
receiving a portion of a query from a user device;
locating a first node representing the portion of a query in the query graph;
locating descendant nodes of the first node, each descendent node being a node that represents a query in the query graph;
ranking the queries represented by the located descendant nodes based on the frequency measures associated with the located descendant nodes; and
sending the portions of queries to the user device.

16. The system of claim 15, wherein the query prefix is received from a browser executing at the user device.

17. The system of claim 15, wherein the query graph is a Patricia trie.

18. The system of claim 15, wherein the one or more computers are further operable to perform operations including:
receiving an identifier of a user category from the user device; and
ranking the portions of queries represented by the located descendant nodes based on the identified user category specific frequency measures associated with the nodes.

19. The system of claim 15, wherein the one or more computers are further operable to perform operations including only sending queries represented by located nodes that have an associated user category frequency measure greater than a threshold frequency.

20. The system of claim 15, wherein the query prefix is received from a toolbar executing at the user device.

* * * * *

UNITED STATES PATENT AND TRADEMARK OFFICE
CERTIFICATE OF CORRECTION

| | | |
|---|---|---|
| PATENT NO. | : 8,027,990 B1 | Page 1 of 1 |
| APPLICATION NO. | : 12/170060 | |
| DATED | : September 27, 2011 | |
| INVENTOR(S) | : Mysen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 448 days.

Signed and Sealed this
Sixth Day of March, 2012

David J. Kappos
*Director of the United States Patent and Trademark Office*